United States Patent [19]

Ingham

[11] Patent Number: 4,459,887
[45] Date of Patent: Jul. 17, 1984

[54] ROTARY SHEAR OF VARIABLE CUT LENGTHS

[75] Inventor: James D. Ingham, Thomaston, Conn.

[73] Assignee: The Hallden Machine Company, Thomaston, Conn.

[21] Appl. No.: 432,648

[22] Filed: Dec. 7, 1982

[51] Int. Cl.³ .............................................. B23D 25/12
[52] U.S. Cl. ........................................ 83/311; 74/393; 74/437; 83/324; 83/572; 192/85 AT; 192/91 A; 192/101
[58] Field of Search .................. 83/76, 311, 324, 593, 83/572, 573; 74/393, 437; 192/56 F, 80, 85 AT, 88 B, 91 R, 91 A, 101

[56] References Cited

U.S. PATENT DOCUMENTS

| | | | |
|---|---|---|---|
| 2,822,047 | 2/1958 | Orr et al. | 83/311 |
| 2,933,940 | 4/1960 | Hallden | 74/437 |
| 2,957,363 | 10/1960 | Ingham et al. | 74/437 |
| 3,585,874 | 6/1971 | Ingham et al. | 74/393 |

Primary Examiner—James M. Meister
Attorney, Agent, or Firm—Walter Spruegel

[57] ABSTRACT

The drum drive in a rotary shear includes a pair of driving and driven surge gears and a coupling of which the driving and driven companion members are drivingly connected with the driven surge gear and with one of the drums. The shear is adjustable for varying the length of stock cut on each revolution of the drums, and such adjustment also requires shear synchronization with the fed stock which is accomplished by disconnecting the coupling members and angularly adjusting the surge gears relative to the drums. The coupling of featured lock type has companion members with cylindrical surfaces which are normally in such an interference fit with each other as safely to transmit without slippage torque in excess of the maximum required for stock-cutting operation of the shear, yet these coupling members are disconnectible for shear synchronization by applying pressurized fluid to their cylindrical interface. In installing this featured lock-type coupling in shears instead of prior gear-type couplings, the formation of intolerable burrs at the edges of stock cut in shears with gear-type couplings is totally eliminated.

4 Claims, 5 Drawing Figures

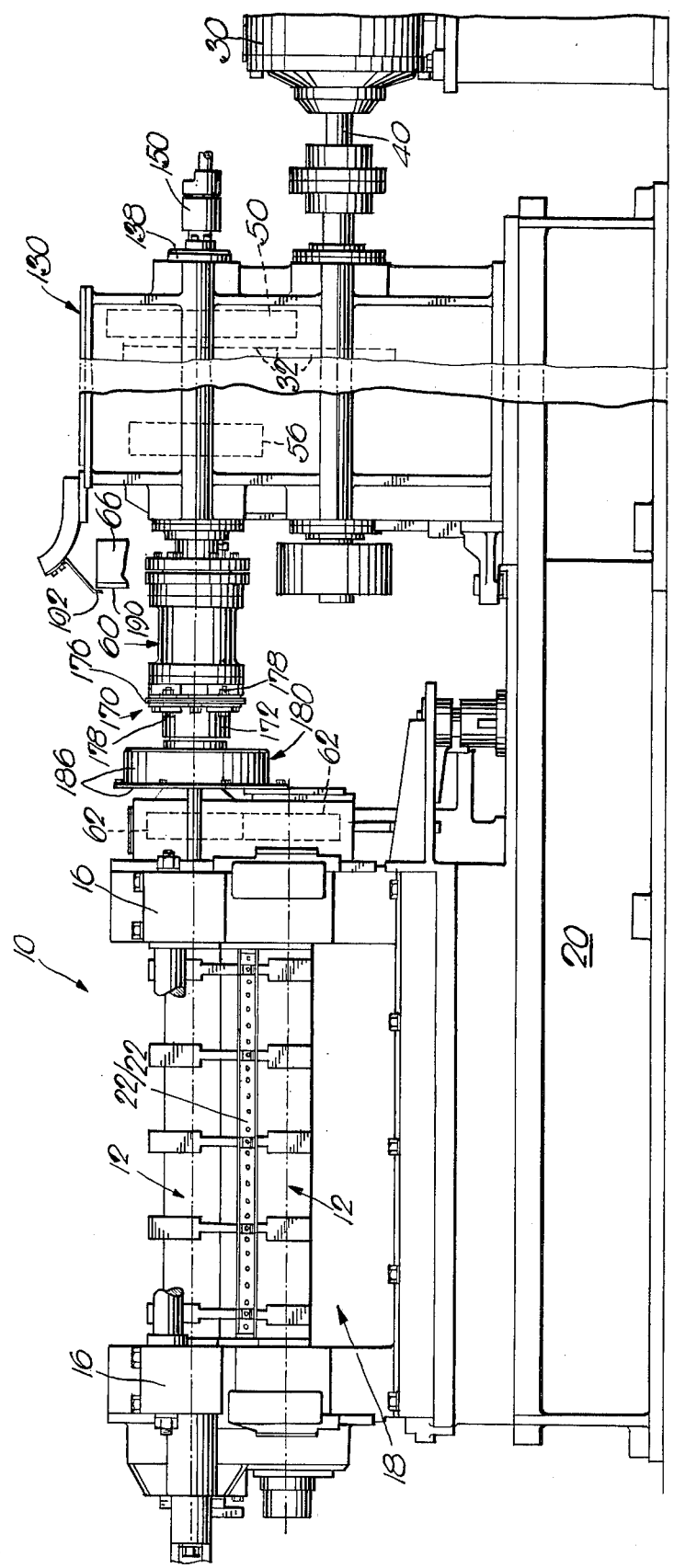

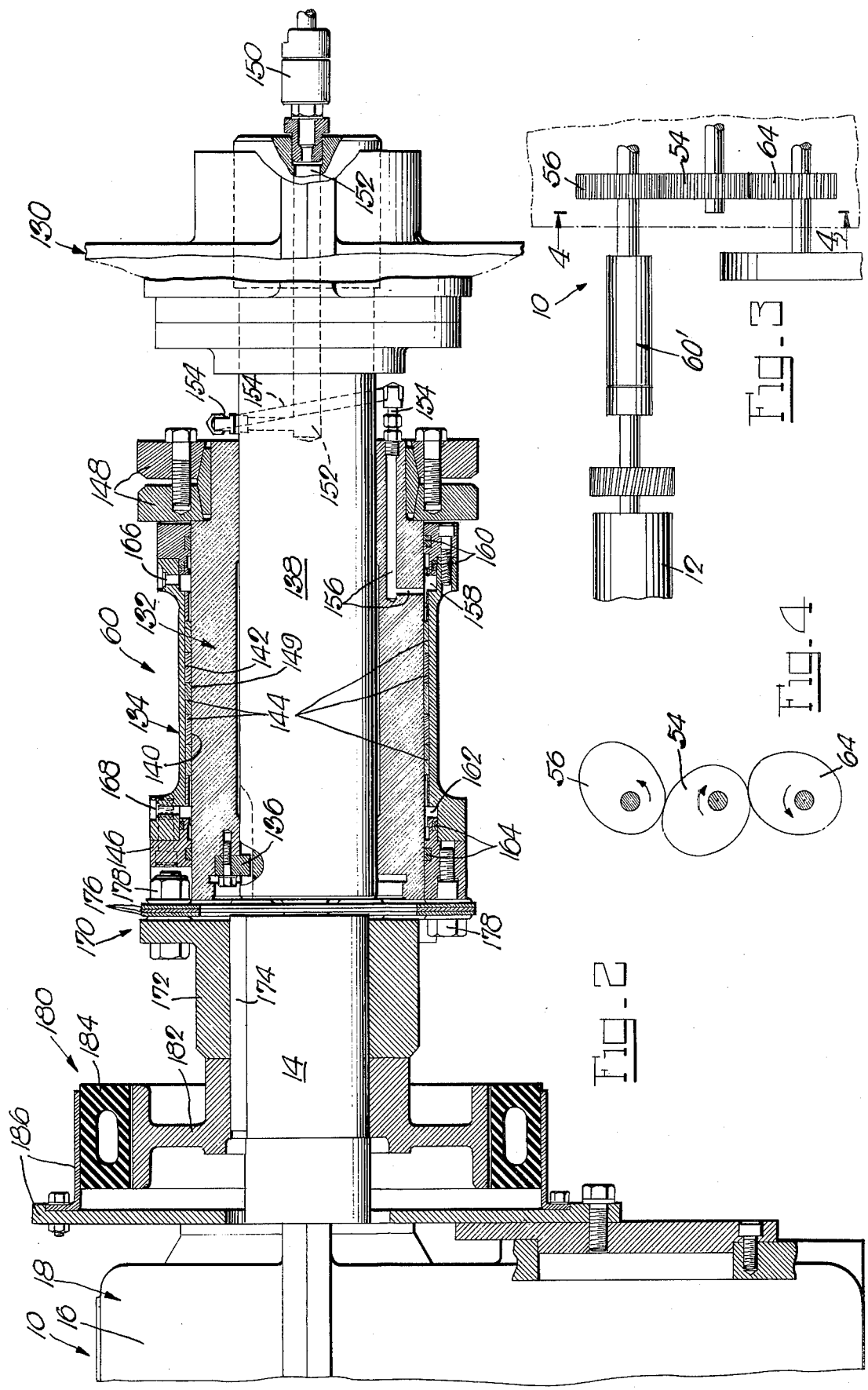

ROTARY SHEAR OF VARIABLE CUT LENGTHS

This invention relates to rotary shears in general, and to rotary shears of variable cut lengths in particular.

The kind of shear to which the invention pertains is used for cutting sheet stock, primarily metal, into shorter lengths, with the shear being adjustable for many variations in cut-lengths over a given cut range from a minimum to a maximum cut-length per revolution of the companion shear drums which carry the shear blades. The shear also provides a stock feed, usually a pair of feed rolls, for advancing stock to the shear drums, with the latter and the feed rolls having for their operation power drives with a common prime mover, usually a motor of adjustable speed type. Both of these drives are customarily adjustable for obtaining any of the many variable cut-lengths with the cut range of the shear, with the drives including to this end different step gear units, an infinitely variable speed ratio unit, a differential gear unit, and a surge gear unit. These units may be arranged and operated in these drives to obtain the cut lengths over the cut range of the shear from minimum to maximum length, for example, by first driving the shear drums at their maximum RPM while progressively increasing the line speed of the stock feed to its maximum over a first part of the cut range of the shear, and then continuing the line drive of the stock feed at its maximum while driving the shear drums at progressively decreasing RPM over the remaining part of the cut range of the shear, with the surge gears being also adjusted for each different cut-length for synchronization of the shear with the fed stock, i.e., for bringing the shear blades in the acceleration phase of their drums to a momentary peripheral speed at which they move in synchronism with the stock at the time of cut. The surge gears are non-circular gears and provide a driver gear and a driven gear in mesh with the driver gear and drivingly connected with the shear drums. The surge gears customarily provide another driven gear which is also in mesh with the driver gear and drivingly connected with a flywheel which is to counterbalance the shear drums in operation. To this end, the shear drums and flywheel have equal inertias, and the non-circular gears have a one-to-one ratio, with the driven gears being identical and 180° displaced from each other. Accordingly, the shear drums and flywheel surge constantly between minimum and maximum speeds, and the ensuing alternating positive and negative torque surges in the shear drums are counteracted by alternating negative and positive torque surges in the flywheel. To thus counteract the torque surges in the shear drums with equal but opposite torque surges in the flywheel, the surge gears were largely elliptic gears, and there also became known a few other and improved surge gears, but all of these gears were found to fall considerably short of producing equal and opposite torque surges in the shear drums and countering flywheel, wherefore these prior surge gears have been replaced more and more by surge gears of the energy-balanced type disclosed in my prior U.S. Pat. No. 2,957,363, dated Oct. 25, 1960.

The driven surge gear for the shear drums is drivingly connected with one of these drums by a disconnectible coupling, and this drum is, in turn, drivingly connected with the other shear drum by a pair of drum gears of one-to-one ratio. The coupling is provided to permit during a rest period of the shear angular adjustment of the surge gears relative to the shear drums for the purpose of moving the shear blades on resumption of the shear drive in synchronism with the fed stock at the time of each stock cut of any length within the range to which the shear has been adjusted. The coupling is to this end temporarily disconnected and is reconnected when the angular adjustment of the surge gears is finished. Couplings for that purpose were mostly of adjustable friction type until they became obsolete when they could no longer cope with increasing torque loads and higher operating speeds of more modern shears and slipped in consequence. It is for this reason that recourse was had to claw-type couplings with their interlocked companion parts that obviate any possible slippage, with these couplings being gear-type couplings because they afford incremental adjustability which, while falling far short of desirable infinite adjustability, is at least adequate for a reasonable number of different cut lengths over the range of a shear.

Extremely serious malfunctioning of shears with gear-type couplings has also been experienced in that some cut edges of stock were left over unpredictable parts of their expanse with very bad and totally unacceptible burrs. Such burrs were found to be most conspicuous on stock edges cut in more modern shears of higher operating speeds and with helical shear blades with their highly advantageous progressive cuts and low power requirements. To overcome such malfunctioning of shears of this type proved to be an extremely difficult problem because there was no explanation of its cause. In dealing with this problem, I did find the cause of such malfunctioning of the shears to be the gear backlash of the gear-type coupling. In this connection, gear-type couplings with teeth of even only a reasonably large number for the purpose necessarily entail quite substantial gear backlash and in any event much more backlash than any other gears in shears. Thus, the change from deceleration to acceleration and back to deceleration in each revolution of the surge gears causes momentary take-up of the gear backlash in the coupling, whereby the ensuing clash between the tooth flanks strikes a rather severe torsional blow to the driven drum masses which sets them into vibration. These tooth impacts in the coupling, severe and rapidly recurring as they are twice in each revolution of the surge gears, make for excessive wear, if not early breakdown, of the coupling. Of far greater gravity, however is the vibration set up in the driven drum masses by the recurring torsional blows to them. Thus, these vibrations, while dampening out rapidly between the recurring torsional blows to these masses, start at fairly large amplitudes at which the magnitude of the resulting impact torque in the drums may exceed their instantaneous torque due to their acceleration and deceleration and, in consequence, cause the shear blades to open momentarily by the amount of backlash in the drum gears. When the shear blades thus open during any part of their cut action on stock in the acceleration phase of the drums, the open blades will cause the aforementioned intolerable burrs in the cut edges of the stock. There is also this further detriment that the companion shear blades become rapidly dull when opening while cutting.

It is the primary aim and object of the present invention to provide a rotary shear of this kind in which any opening of the shear blades in cutting action, and hence the formation of burrs in the cut edges of stock, are totally avoided, by providing between the surge gears and shear drums a coupling the companion members of which are readily disconnectible for adjustment of the surge gears relative to the shear drums, yet in action are locked together as firmly as if they were formed integrally with each other.

It is another important object of the present invention to provide a rotary shear of this kind in which the coupling between the surge gears and shear drums is of a locktype of which the companion members are provided with annular surfaces which in the connected coupling have such a tight interference fit that they remain frictionally locked to each other at torques which are safely above the maximum torques transmitted by the shear drive to the drums, yet these companion members are, for the aforementioned surge gear adjustment in the shear synchronization with the fed stock, readily disconnected at their interface by introducing pressurized fluid thereat.

It is a further object of the present invention to provide a rotary shear of this kind in which for safe transmission of the high operational torque required for unfailing operation of the shear drums, the interference fit between the companion members of the aforementioned lock-type coupling must be of rather high magnitude, which requires a fairly high pressure of the operating fluid in order to disconnect the coupling for permitting the aforementioned surge gear adjustment by jogging the drum drive. Such operational pressure of the operating fluid clearly calls for the provision of fluid-confining ring seals at the opposite ends of the annular interface between the coupling members. However, with such seals inevitably exerting a drag on the disconnected coupling members when jogging the drum drive for surge gear adjustment, it could well happen that the driven coupling member is frictionally dragged along with the driving member through intermediation of the seals and thereby spoil the shear synchronization. In order to avoid with certainly frictional drag of the driven coupling member with the driving coupling member in its set position in which the shear drums are in their cut position as an imperative condition for correct shear synchronization, there is provided a brake mechanism having companion members of which one member is fixed and the other is turnable with the driven coupling member, with the turnable brake member being normally out of operative relation with the fixed brake member but operable into brake relation therewith when the coupling is disconnected and the surge gears are adjusted for shear synchronization. Thus, when the coupling is disconnected and the surge gears are being adjusted, the driven coupling member and the shear drums cannot be dragged along with the driving coupling member and are, instead, held stationary by the brake members which are then held in braking engagement.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view of a rotary shear which embodies the invention;

FIG. 2 is an enlarged fragmentary section through the shear and showing a part of the drum drive which embodies the invention;

FIG. 3 is a fragmentary diagrammatic view of a part of a prior drum drive which lacks the invention;

FIG. 4 is a section taken substantially on the line 4—4 of FIG. 3; and

Figure 5:
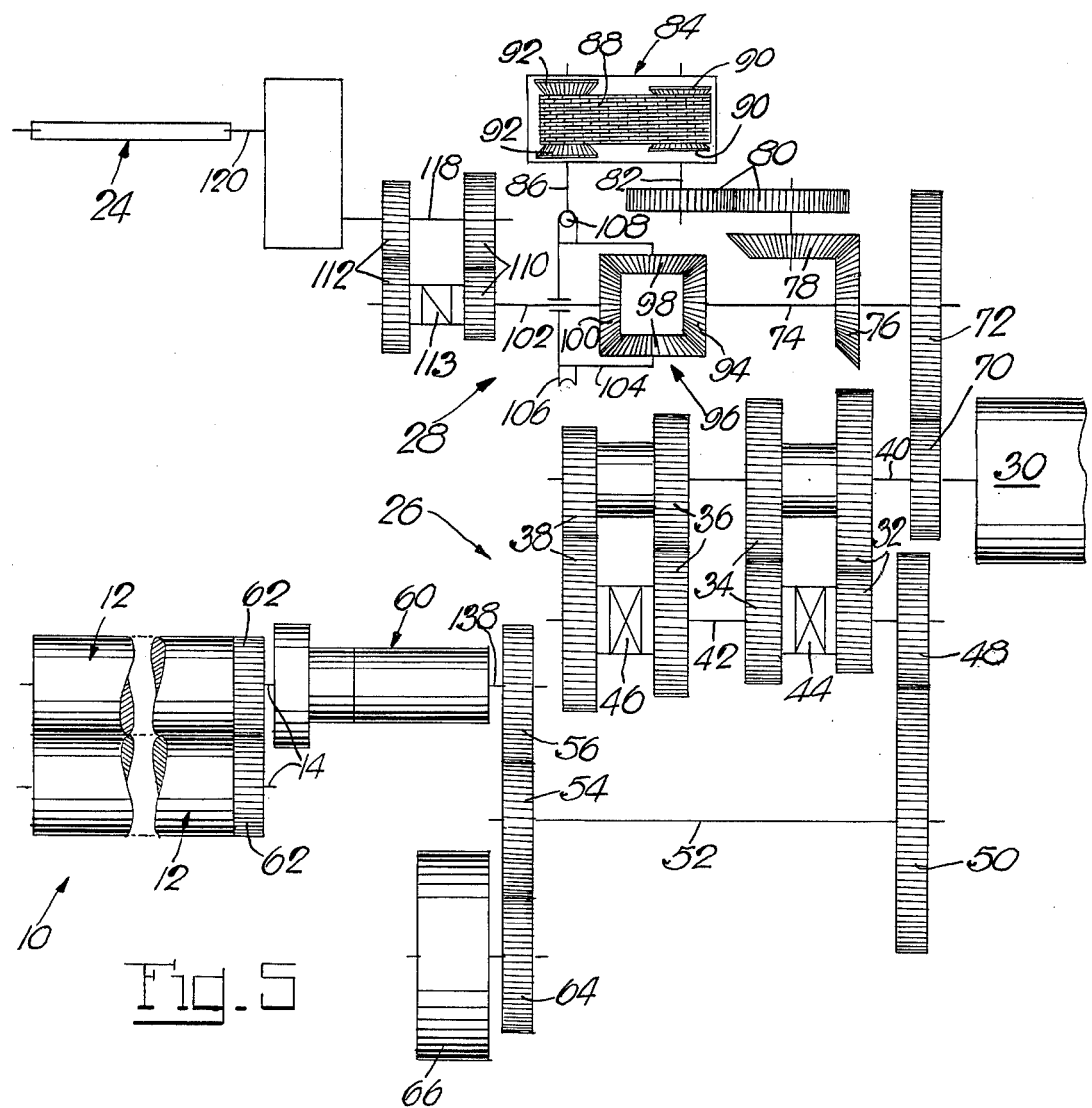
FIG. 5 is a diagrammatic view of an exemplary power drive of the present shear.

Referring to the drawings, and more particularly to FIGS. 1, 2 and 5 thereof, the reference numeral 10 designated a rotary shear having a pair of drums 12 on shafts 14 which are journalled in suitable bearings in spaced uprights 16 of a shear frame 18 which is mounted on a bed 20, The drums 14 carry companion shear blades 22 which once in each revolution of the drums align and cut stock as it is continuously fed between them. To the latter end, there is associated with the shear 10 a stock feed 24 which in this instance provides a pair of power-driven feed rolls (FIG. 5).

There are also provided power drives 26 and 28 for the drums 12 and the stock feed 24, respectively, with both drives having a common prime mover in the exemplary form of a variable-speed motor 30. The drum drive 26 provides in this instance four pairs of step gears 32, 34, 36 and 38 of which the driving gears are keyed to a shaft 40 that is driven by the motor 30, and the driven gears turn freely on a counter shaft 42, with either one of these driven gears being connectible with the shaft 42 through an associated splined clutch member 44 or 46 to activate the respective pair of step gears into driving the shaft 42. Keyed to shaft 42 is another gear 48 which is in mesh with a bull gear 50 on one end of a shaft 52 the opposite end of which has keyed thereto the driver 54 of a pair of surge gears of 1 to 1 ratio of which the driven gear 56 is connected with one of the drums 12 by a disconnectible coupling 60, and the drums 12 are connected with each other by a pair of gears 62 of 1 to 1 ratio. The surge gears, which include another gear 64 that is identical with the gear 56 and 180° displaced therefrom, are non-circular gears (FIG. 4), and as already mentioned earlier are preferably gears of the energy-balanced type shown in my prior U.S. Pat. No. 2,957,363. The other driven surge gear 64 turns with a flywheel 66 which has the same inertia as the drums 12 and coupling 60 driven by the surge gear 56, and the gears 54, 56 and 64 of energy-balanced type are so designed that the torques of the driven gears 56 and 64 react with that of the driver gear 54 in achieving at any instant torque balance in the drive shaft 52.

The feed drive 28 starts in this instance with a gear 70 on the motordriven shaft 40, with the gear 70 being in mesh with a gear 72 on a shaft 74 which through a pair of bevel gears 76, 78 and another pair of gears 80 drives the input shaft 82 of an infinitely adjustable speed-ratio unit 84 with an output shaft 86. The unit 84 is a commercial device known as a "P.I.V.", made by the Link Belt Company of Philadelphia, Pa., and comprises a sprocket chain 88 arranged in driving relationship between two pairs 90 and 92 of conical sprocket wheels adapted to be moved toward and from each other for changing the relative speeds of the respective shafts 82 and 86 to which they are splined. Shaft 74 carries a sun gear 94 of a differential gearing 96 having a pair of planetary gears 98 in mesh with the sun gear 94 and with another sun gear 100 which is axially aligned with shaft 74. The planetary gears 98 are carried by a differential housing 104 which is freely turnable on a shaft 102 and is provided with a worm wheel 106 that is in mesh with a worm 108 on the output shaft 86 of the speed-ratio unit 84. Freely turnable on the shaft 102 are the drivers of two step gears 110 and 112 either one of which may be connected with the shaft 102 by a splined clutch member 113, while the driven gears are keyed to a shaft 118 that is drivingly connected with the shaft 120 of one of the feed rolls 24, with both feed rolls 24 being connected by a pair of gears (not shown) for their joint drive in opposite directions. Most of the described elements of the drum and feed drives 26 and 28 are arranged in a drive box 130 on the machine bed 20 (FIG. 1).

The exemplary drum and feed drives 26 and 28 are adjustable for different shear operations. Thus, to cut stock lengths within four successive main ranges, the respective step gears 32, 34, 36 and 38 are included in the drum drive 26, and each of these main ranges is divided into two successive sub-ranges of stockcut-lengths by also including the respective step gears 110 and 112 in the feed drive 28, while the gaps between successive cut-lengths are bridged by adjustments of the speed-ratio unit 84 and ensuing changes in the output speed of the differential gearing 96 and by adjustments of the speed of the motor 30, respectively. Thus, and by way of example, the shortest cut-length is obtained at the lowest speed of the shaft 40 and with the drum drive 26 including the step gear 32, and the feed drive 28 including the step gear 110. For any succeeding cut-length to and including the last cut-length in the first sub-range of the first main range, everything remains as just described, except that the output speed of the differential gearing is increased for each succeeding cut-length. The first to last cut lengths in the second sub-range of the first main range are obtained still at the same speed of the shaft 40, and with the drum drive still including the step gear 32, and with the output speed of the differential gearing 96 being again incrementally increased for each successive cut-length, and the feed drive 28 now including the step gear 112. The first to last cut-lengths in the first sub-range of the second main range are obtained at a now increased speed of the shaft 40, and with the drum drive 26 now including the step gear 34 and the feed drive 28 now including the step gear 110, and the output speed of the differential gearing 96 being also increased for each succeeding cut-length. For the first to last cut-lengths in the second sub-range of the second main range, the shaft 40 remains at the same speed, the drum drive 26 still includes the step gear 34 and the output speed of the differential gearing 96 is increased for each succeeding cut-length, but the feed drive 28 now includes the step gear 112. The first to last cut-lengths in the first subrange of the third main range are obtained at a now increased speed of the shaft 40, and with the drum drive 26 including the step gear 36, and the feed drive including the step gear 110, and the output speed of the differential gearing 96 is increased for each successive cut-length. The exemplary operation of the shear described so far involves a uniform drive of the shear drums at maximum RPM, and the feed of stock at progressively increasing rate to its maximum rate, while for the remaining operation of the shear through its fourth and last main range of cut-lengths, the feed rate of the stock remains at its maximum while the shear drums are driven at progressively decreasing RPM. Thus, the first to last cut-lengths in the first sub-range of the fourth main range are obtained by including the step gear 38 in the drum drive and including the step gear 110 in the feed drive 28, while the speed of the shaft 40 and the output speed of the differential gearing 96 are decreased and increased, respectively, for each successive cut-length. Finally, the first to last cut-lengths in the second sub-range of the fourth main range are obtained by leaving the step gear 38 in the drum drive 26 but including the step gear 112 in the feed drive 28, and continuing to decrease the speed of the shaft 40 and increase the output speed of the differential gearing 96 for each successive cut-length.

Adjustment of the shear to any cut-length also requires synchronization of the shear with the fed stock, i.e., adjustment of the drum drive 26 so that the peripheral speed of the cutting edges of the shear blades on the drums 12 is equal to the linear speed of the fed stock at the times of cut. Such synchronization adjustment of the drum drive 26 involves angular adjustment of the surge gears 54, 56 relative to the drums and while the surge gear 56 passes through its acceleration phase. To the end of undertaking such synchronization of the shear, the drum drive 26 and with it the feed drive 28 are activated by jogging the motor 30 to bring the shear drums into exact cut position in which their shear blades are aligned. The coupling 60 is then disconnected to permit subsequent turning movement of the surge gears relative to the shear drums in their cut position. When the coupling 60 is then disconnected, the drum and feed drives 26 and 28 will again be activated by jogging the motor 30 until the gear 56 assumes on its acceleration phase the correct angular position in which it will, after reengagement of the coupling 60 and resumption of the operation of the shear, impart to the shear drums the correct momentary synchronous speed at the time of each cut action of the shear blades on the fed stock.

The coupling 60' in the shear 10 of FIG. 3 is of the aforementioned gear type which accounts for the explained serious malfunctioning of rotary shears and the ensuing formation of intolerable burrs in the cut edges of stock. To avoid such burrs in the cut edges of stock, recourse was had to the coupling 60 of featured lock-type in FIGS. 1, 2 and 5. The coupling 60 provides inner and outer cylindrical companion members 132 and 134 of which the inner member 132 is driven and keyed at 136 to a shaft 138 which is suitably journalled in the drive box 130 and carries the surge gear 56 (FIGS. 1 and 2). The companion members 132 and 134 have cylindrical surfaces 140 and 142, respectively, which are in an interference fit with each other in this instance through intermediation of pressure rings 144. End collars 146 and 148 are suitably clamped to the inner coupling member 132 to lock the outer coupling member 134 against axial movement on the inner member 132. The coupling members 132 and 134 are, for shear synchronization, disconnectible at the annular interface 149 between the inner member 132 and the pressure rings 144. To this end, pressurized fluid, such as oil under pressure, for example, is supplied to the interface 149 from a suitable pump (not shown) via a rotary union 150, a passage 152 in shaft 138, a conduit 154 between the passage 152 in shaft 138 and a passage 156 in the inner coupling member 132 that leads to an annular passage 158 which is closed off by sealing rings 160 but open to one end of the annular interface 149 between the inner coupling member and the pressure rings 144, with the interface 149 being at its other end open to another annular passage 162 which is otherwise closed off by sealing rings 164, and both passages 158 and 162 being preferably provided with ports 166 and 168 for the reception of hollow bleed plugs (not shown). The drive coupling member 134 is drivingly connected with the shaft 14 of the upper shear drum 12 by a flexible coupling 170 which has an end 172 keyed at 174 to this shaft 14 and a pack of washers 176 with screws 178 that connect the latter with the coupling members 172 and 134.

The interference fit between the companion members 132 and 134 of the lock-type coupling 60 is of a magnitude assuredly to transmit without slippage the maximum torque required in the operation of the shear. However, while the application of pressurized fluid to the interference fit between the coupling members 132 and 134 will fully disengage the latter, the sealing rings 160 and 164 are in frictional engagement with both coupling members which is most likely of sufficient magnitude to drag along the driven coupling member 134, and hence the shear drums 12, on rotation of the driving coupling member 132 for shear synchronization and thus spoil the synchronization. In order to make certain that the driven coupling member 134 and the shear drums 12 are not dragged along with the driving coupling member 132 on its rotation for shear synchronization, there is provided a brake 180 for the driven coupling member 134, with the brake having companion members 182 and 184 of which the member 182 is at 174 keyed to the drum shaft 14 (FIG. 2), and the other member 184 is held against rotation on a fixed mounting plate 186 on the shear frame 18, and is in the form of a resilient hollow ring which is normally out of braking engagement with the brake member 182, but may be charged with pressurized fluid, such as compressed air, for example, by an operator to expand it into engagement with the brake member 182 and thus lock the latter, and hence the driven coupling member 134 and the shear drums 12, against rotation on turning the driving coupling member 132, and hence the surge gears 54,56 and 64, for shear synchronization.

Shear synchronization to any selected cut-length by angular adjustment of the surge gears 54,56 and 64 relative to the drums 12 is greatly facilitated by a disc 190 on the flywheel 66 and a fixed arrow 192 on the drive box 130 (FIG. 1), with the disc 190 bearing graduations which are marked in cut-lengths to which the shear is adjustable. These graduations on the disc 190 are so coordinated with the shear drums 12 and the arrow 192 that on turning the disc with the flywheel 66 to bring the graduation representing any selected cut-length into alignment with the arrow 192, the shear is synchronized for this selected cut-length, whereupon the coupling 60 is reengaged by shutting off the pressurized fluid and venting the annular passages 158 and 162 in the coupling, and the brake 180 is released by shutting off the pressurized activating fluid therefor and venting the hollow brake member 184 for its retraction from the other brake member 182, thereby restoring the drum drive 26 for renewed operation of the shear on the drive of the motor 30.

What is claimed is:

1. In a rotary shear, the combination of a pair of drivingly connected rotary shear drums to cut stock, a power drive for said drums, including a pair of meshed non-circular driving and driven gears, and a coupling with a rotary axis and driving and driven companion members having annular surfaces about said axis normally in an interference fit of a magnitude to transmit without slippage torque in excess of maximum torque required for stock cutting operation of said drums, with said driving and driven coupling members being drivingly connected with said driven gear and one of said drums, respectively, and means for applying pressurized fluid to said coupling members at their annular interface to relieve the interference thereat and permit said driving coupling member to turn relative to said driven coupling member on jogging said power drive for angularly adjusting said driven gear relative to said drums.

2. The combination in a rotary shear as in claim 1, in which said drums carry helically disposed companion shear blades.

3. In a rotary shear, the combination of a pair of drivingly connected rotary shear drums to cut stock, a power drive for said drums, including a pair of meshed non-circular driving and driven gears, and a coupling with a rotary axis and driving and driven companion members having annular surfaces about said axis, of which intermediate lengths of said surfaces have an interference fit of a magnitude to transmit without slippage torque in excess of maximum torque required for stock cutting operation of said drums, with said driving and driven coupling members being drivingly connected with said driven gear and one of said drums, respectively, and opposite endlengths of said annular surfaces being radially spaced to form annular recesses, ring seals in said recesses, means for applying pressurized fluid to said intermediate surface lengths to relieve their interference fit and permit said driving coupling member to turn relative to said driven coupling member on jogging said power drive for angular adjustment of said driven gear relative to said drums, and a normally inoperative brake operable to lock said driven coupling member against frictional drag with its companion member on said angular adjustment of said driven gear relative to said drums.

4. The combination in a rotary shear as in claim 3, in which said power drive further includes a rotary shaft with an exposed end, said driving coupling member is a sleeve keyed to said shaft, and said fluid applying means provides a port in one of said recesses between said ring seal therein and the nearest end of the interference fit between said intermediate surface lengths, and conduit means to said port, including an axial orifice in said shaft leading from said exposed shaft end.

* * * * *